United States Patent
Langille et al.

(10) Patent No.: US 12,441,681 B2
(45) Date of Patent: Oct. 14, 2025

(54) SYNTHESIS OF SULFONAMIDE INTERMEDIATES

(71) Applicant: AMGEN INC., Thousand Oaks, CA (US)

(72) Inventors: Neil Fred Langille, Sudbury, MA (US); Jason S. Tedrow, Salem, MA (US); Jonathan Vinh-Phu Truong, Thousand Oaks, CA (US); Robert Ronald Milburn, Belmont, CA (US); Alessandro Arena, Vicenza (IT)

(73) Assignees: AMGEN INC., Thousand Oaks, CA (US); F.I.S.—FABBRICA ITALIANA SINTETICI SPA, Vicenza (IT)

( * ) Notice: Subject to any disclaimer, the term of this patent is extended or adjusted under 35 U.S.C. 154(b) by 562 days.

(21) Appl. No.: 17/923,015

(22) PCT Filed: Apr. 28, 2021

(86) PCT No.: PCT/US2021/029523
§ 371 (c)(1),
(2) Date: Nov. 3, 2022

(87) PCT Pub. No.: WO2021/225833
PCT Pub. Date: Nov. 11, 2021

(65) Prior Publication Data
US 2023/0357137 A1 Nov. 9, 2023

Related U.S. Application Data

(60) Provisional application No. 63/020,951, filed on May 6, 2020.

(51) Int. Cl.
| | |
|---|---|
| C07C 303/36 | (2006.01) |
| C07C 29/62 | (2006.01) |
| C07C 67/08 | (2006.01) |
| C07C 303/28 | (2006.01) |
| C07D 213/70 | (2006.01) |

(Continued)

(52) U.S. Cl.
CPC ........... *C07C 303/36* (2013.01); *C07C 29/62* (2013.01); *C07C 67/08* (2013.01); *C07C 303/28* (2013.01); *C07D 213/70* (2013.01); *C07D 213/71* (2013.01); *C07D 301/24* (2013.01);

(Continued)

(58) Field of Classification Search
None
See application file for complete search history.

(56) References Cited

U.S. PATENT DOCUMENTS

| | | |
|---|---|---|
| 9,562,061 B2 | 2/2017 | Brown et al. |
| 10,300,075 B2 | 5/2019 | Brown et al. |

FOREIGN PATENT DOCUMENTS

| | | |
|---|---|---|
| JP | 2017525730 | 9/2017 |
| JP | 2018199667 | 12/2018 |

(Continued)

OTHER PUBLICATIONS

Bystrom, S., et al.: "Chiral Synthesis of (2S,3S, 7S)-3,7-Dimethylpentadecan-2-yl Acetate and Propionate, Potential Sex Pheromone Components of the Pine Saw-Fly Neodiprion Sertifer (Geoff.)," Tetrahedron, vol. 37, pp. 2249-2254 (1981).

(Continued)

*Primary Examiner* — Noble E Jarrell

(57) ABSTRACT

Provided herein are processes for synthesizing Mcl-1 inhibitors and intermediates such as compound Z that can be used to prepare them. In particular, provided herein are processes for synthesizing compound A1, and salts or solvates thereof and compound A2, and salts and solvates thereof.

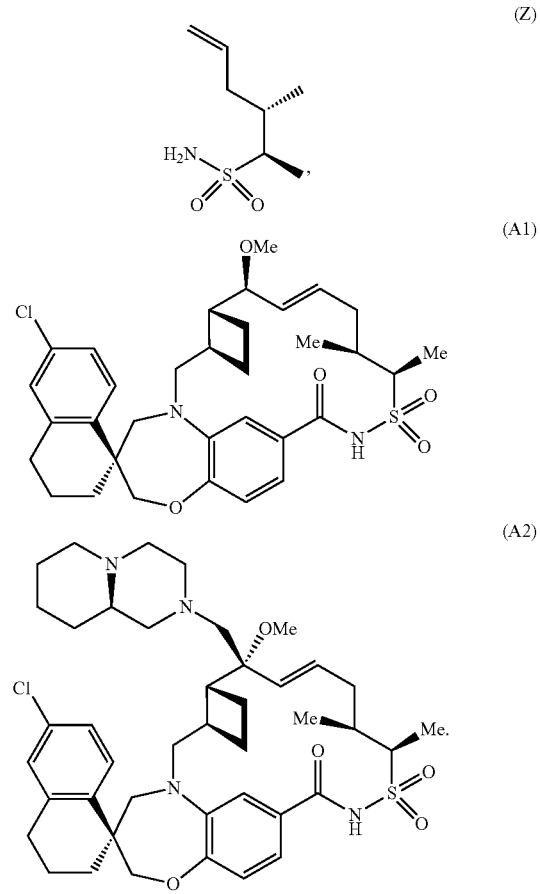

80 Claims, No Drawings

(51) Int. Cl.
    *C07D 213/71*    (2006.01)
    *C07D 301/24*    (2006.01)
    *C07D 513/06*    (2006.01)
    *C07D 519/00*    (2006.01)

(52) U.S. Cl.
    CPC ......... *C07D 513/06* (2013.01); *C07D 519/00* (2013.01); *C07B 2200/13* (2013.01)

(56) References Cited

FOREIGN PATENT DOCUMENTS

| WO | 2016033486 | 3/2016 |
| WO | 2018183418 | 10/2018 |

OTHER PUBLICATIONS

Mori, K., et al., "Stereocontrolled Synthesis of all of the Four Possible Stereoisomers of Erythro-3,7-dimethyl-pentadec-2-yl Acetate and Propionate, the Sex Pheromone of the Pine Sawflies," Tetrahedron, vol. 35(10), pp. 1279-1284 (1979).

Takle, A., et al. "A Synthesis of Lacrimin A", Tetrahedron Letters, vol. 30(13), pp. 1675-1678 (1989).

Takle, A., et al., "A New Approach to 1,7-Dioxaspiro[5.5]undec-4-enes Via Metallated Allenol Ethers. Synthesis of Lacrimin A," Tetrahedron, vol. 46(13/14), pp. 4503-4516 (1990).

SYNTHESIS OF SULFONAMIDE INTERMEDIATES

CROSS REFERENCES TO RELATED APPLICATIONS

This application claims the benefit of U.S. Provisional Application No. 63/020,951, filed on May 6, 2020, which is hereby incorporated by reference in its entirety and for all purposes as if fully set forth herein.

TECHNICAL FIELD

The present disclosure relates to processes for synthesizing intermediates useful in preparing (1S,3'R,6'R,7'S,8'E,11'S,12'R)-6-chloro-7'-methoxy-11',12'-dimethyl-3,4-dihydro-2H,15'H-spiro[naphthalene-1,22'[20]oxa[13]thia[1,14]diazatetracyclo[14.7.2.0$^{3,6}$.0$^{19,24}$]pentacosa [8,16,18,24]tetraen]-15'-one 13',13'-dioxide (compound A1; AMG 176), a salt, or solvate thereof and in preparing (1S,3'R,6'R,7'R,8'E,11'S,12'R)-6-chloro-7'-methoxy-11',12'-dinethyl-7'-((9aR)-octahydro-2H-pyrido[1,2-a]pyrazin-2-ylmethyl)-3,4-dihydro-2H,15'H-spiro[naphthalene-1,22'-[20]oxa[13]thia[1,14]diazatetracyclo[14.7.2.0$^{3,6}$.0$^{19,24}$]pentacosa[8,16,18,24]tetraen]-15'-one 13',13'-dioxide (compound A2; AMG 397), a salt, or solvate thereof. These compounds are inhibitors of myeloid cell leukemia 1 protein (Mcl-1).

DESCRIPTION OF RELATED TECHNOLOGY

The compound, (1S,3'R,6'R,7'S,8'E,11'S,12'R)-6-chloro-7'-methoxy-11',12'-dimethyl-3,4-dihydro-2H,15'H-spiro[naphthalene-1,22'[20]oxa[13]thia[1,14]diazatetracyclo[14.7.2.0$^{3,6}$.0$^{19,24}$]pentacosa[8,16,18,24]tetraen]-15'-one 13',13'-dioxide (compound A1), is useful as an inhibitor of myeloid cell leukemia 1 (Mcl-1):

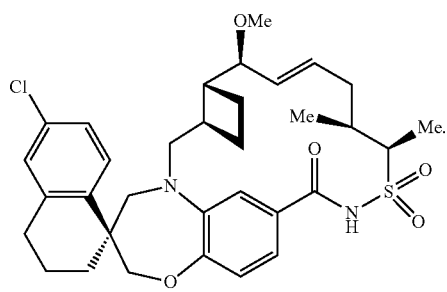

(A1)

The compound, (1S,3'R,6'R,7'R,8'E,11'S,12'R)-6-chloro-7'-methoxy-11',12'-dinethyl-7'-((9aR)-octahydro-2H-pyrido[1,2-a]pyrazin-2-ylmethyl)-3,4-dihydro-2H,15'H-spiro[naphthalene-1,22'-[20]oxa[13]thia[1,14]diazatetracyclo[14.7.2.0$^{3,6}$.0$^{19,24}$]pentacosa[8,16,18,24]tetraen]-15'-one 13',13'-dioxide (compound A2), is useful as an inhibitor of myeloid cell leukemia 1 (Mcl-1):

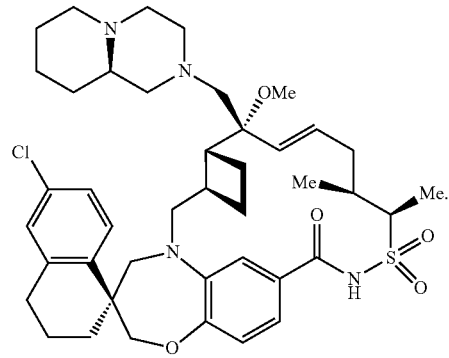

(A2)

One common characteristic of human cancer is overexpression of Mcl-1. Mcl-1 overexpression prevents cancer cells from undergoing programmed cell death (apoptosis), allowing the cells to survive despite widespread genetic damage.

Mcl-1 is a member of the Bcl-2 family of proteins. The Bcl-2 family includes pro-apoptotic members (such as BAX and BAK) which, upon activation, form a homo-oligomer in the outer mitochondrial membrane that leads to pore formation and the escape of mitochondrial contents, a step in triggering apoptosis. Antiapoptotic members of the Bcl-2 family (such as Bcl-2, Bcl-XL, and Mcl-1) block the activity of BAX and BAK. Other proteins (such as BID, BIM, BIK, and BAD) exhibit additional regulatory functions. Research has shown that Mcl-1 inhibitors can be useful for the treatment of cancers. Mcl-1 is overexpressed in numerous cancers.

U.S. Pat. No. 9,562,061, which is incorporated herein by reference in its entirety, discloses compound A1 as an Mcl-1 inhibitor and provides a method for preparing it. However, improved synthetic methods that result in greater yield and purity of compound A1 are desired, particularly for the commercial production of compound A1.

U.S. Pat. No. 10,300,075, which is incorporated herein by reference in its entirety, discloses compound A2 as an Mcl-1 inhibitor and provides a method for preparing it. However, improved synthetic methods that result in greater yield and purity of compound A2 are desired, particularly for the commercial production of compound A2.

SUMMARY

Provided herein are processes for synthesizing compound Z, or a salt thereof:

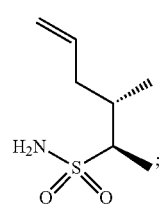

(Z)

comprising: (a) admixing (2S,3S)-butane-2,3-diol, a bromide source, and acetic acid to form compound I

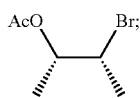

(I)

(b) admixing compound I and a non-nucleophilic base to form compound J

(J)

(c) admixing compound J and an allyl nucleophile to form compound K

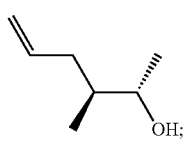

(K)

(d) admixing compound K, a leaving group reagent, and an amine base to form compound L

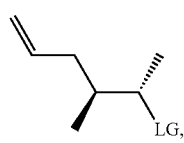

(L)

wherein LG is a leaving group; (e) admixing compound L, a non-nucleophilic base, and $Ar^1$—SH to form compound M

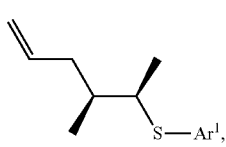

(M)

wherein $Ar^1$ is a 5-12 membered heteroaryl comprising from 1 to 3 ring heteroatoms selected from O, N, and S; (f) oxidizing compound M to form compound N

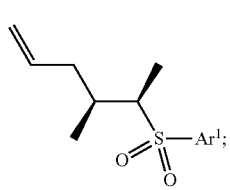

(N)

and (g) admixing compound N, a base and hydroxylamine-O-sulfonic acid to form compound Z.

Also provided herein are processes comprising using compound Z to synthesize compound A1 or a salt or solvate thereof, or compound A2 or a salt or solvate thereof:

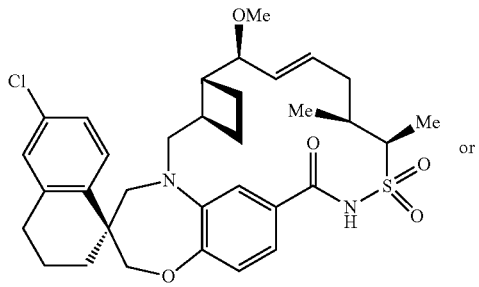

(A1)

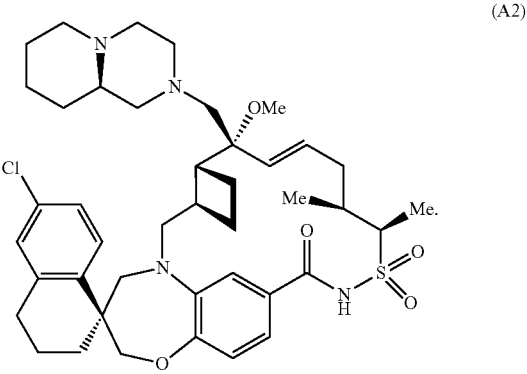

(A2)

Further aspects and advantages will be apparent to those of ordinary skill in the art from a review of the following detailed description. The description hereafter includes specific embodiments with the understanding that the disclosure is illustrative, and is not intended to limit the invention to the specific embodiments described herein.

DETAILED DESCRIPTION

Provided herein are processes for synthesizing Mcl-1 inhibitors and corresponding sulfonamide Mcl-1 inhibitor intermediates. In particular, the sulfonamide intermediates can be used in processes for synthesizing (1S,3'R,6'R,7'S, 8'E,11'S,12'R)-6-chloro-7'-methoxy-11',12'-dimethyl-3,4-dihydro-2H,15'H-spiro[naphthalene-1,22120]oxa[13]thia[1, 14]diazatetracyclo[14.7.2.0$^{3,6}$.0$^{19,24}$]pentacosa [8,16,18,24] tetraen]-15'-one 13',13'-dioxide (compound A1), or a salt or solvate thereof and in processes for synthesizing (1S,3'R, 6'R,7'R,8'E,11'S,12'R)-6-chloro-7'-methoxy-11',12'-dinethyl-7'4(9aR)-octahydro-2H-pyrido[1,2-a]pyrazin-2-ylmethyl)-3,4-dihydro-2H,15'H-spiro[naphthalene-1,22'-[20] oxa[13]thia[1,14]diazatetracyclo [14.7.2.0$^{3,6}$.0$^{16,24}$] pentacosa[8,16,18,24]tetraen]-15'-one 13',13'-dioxide (compound A2), or a salt or solvate thereof:

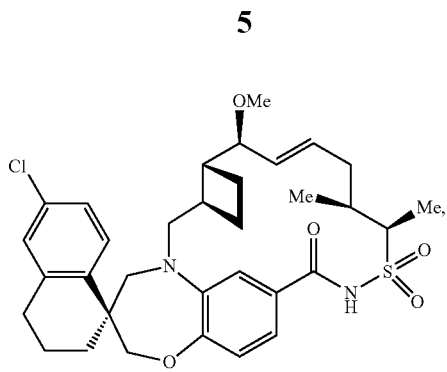

(A1)

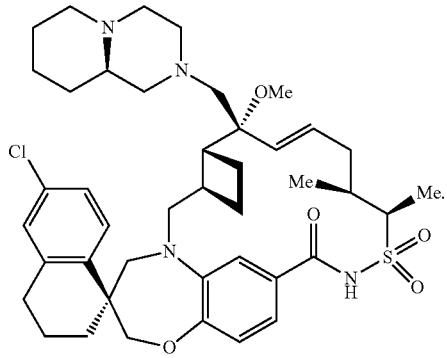

(A2)

U.S. Pat. No. 9,562,061, which is incorporated herein by reference in its entirety, discloses compound A1, or a salt or solvate thereof, as an Mcl-1 inhibitor and provides a process for preparing it. U.S. Pat. No. 9,562,061 also discloses a process of synthesizing sulfonamide Mcl-1 inhibitor intermediates used in the synthesis of compound A1.

U.S. Pat. No. 10,300,075, which is incorporated herein by reference in its entirety, discloses compound A2, or a salt or solvate thereof, as an Mcl-1 inhibitor and provides a process for preparing it. U.S. Pat. No. 10,300,075 also discloses a process of synthesizing sulfonamide Mcl-1 inhibitor intermediates used in the synthesis of compound A2.

In particular, the '061 patent describes a process for synthesizing a sulfonamide intermediate, compound Z:

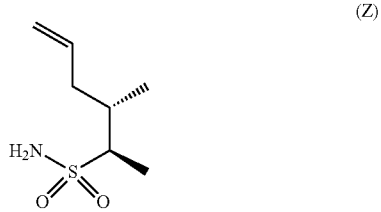

(Z)

shown in scheme 1.

Scheme 1-Synthesis of
Sulfonamide Mcl-1 Inhibitor Intermediate from '061 Patent

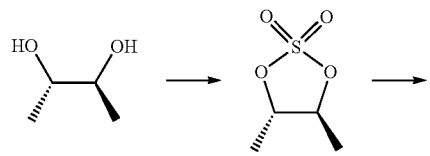

-continued

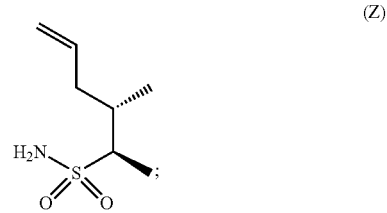

The '061 patent describes the isolation of each of the intermediate compounds prior to use in the next step of the synthesis. Further, the '061 patent disclosed the step from (4S,5S)-4,5-dimethyl-1,3,2-dioxathiolan 2,2-dioxide to (2S,3S)-3-methylhex-5en-2-ol has synthetic results with variable chemical and chiral purities levels that can lead to laborious work-up steps, such as chromatography, that result in substantially lower yields. Advantageously, use of the different synthetic strategy from the starting butane diol described herein leads to higher yield, better efficiency, and produces highly pure products through isolation of crystalline intermediate (e.g., compound N, $Ar^1$=pyridyl or pyrimidinyl) and crystalline target compound (Z). The processes described herein avoid the formation of dimeric sulfur-based impurities that are challenging to remove, provides improved chiral and chemical purity, improved safety, and provides flexibility to produce at both small scale (e.g., <1 gram) and large scale (e.g., multi-kg).

Provided herein are processes for synthesizing compound Z, or a salt thereof:

(Z)

comprising: (a) admixing (2S,3S)-butane-2,3-diol, a bromide source, and acetic acid to form compound I

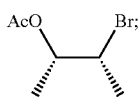

(b) admixing compound I, and a non-nucleophilic base to form compound J

(c) admixing compound J and an allyl nucleophile to form compound K

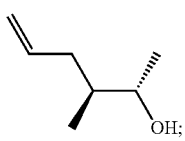

(d) admixing compound K, a leaving group reagent, and an amine base to form compound L

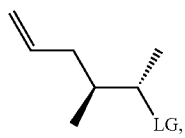

wherein LG is a leaving group;
(e) admixing compound L, a non-nucleophilic base, and $Ar^1$—SH to form compound M

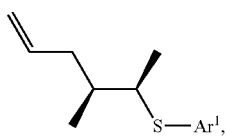

wherein $Ar^1$ is a 5-12 membered heteroaryl comprising from 1 to 3 ring heteroatoms selected from O, N, and S;
(f) oxidizing compound M to form compound N

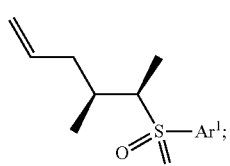

(g) admixing compound N, a base and hydroxylamine-O-sulfonic acid to form compound Z.

A general reaction scheme for the processes described herein is provided in Scheme 2, below:

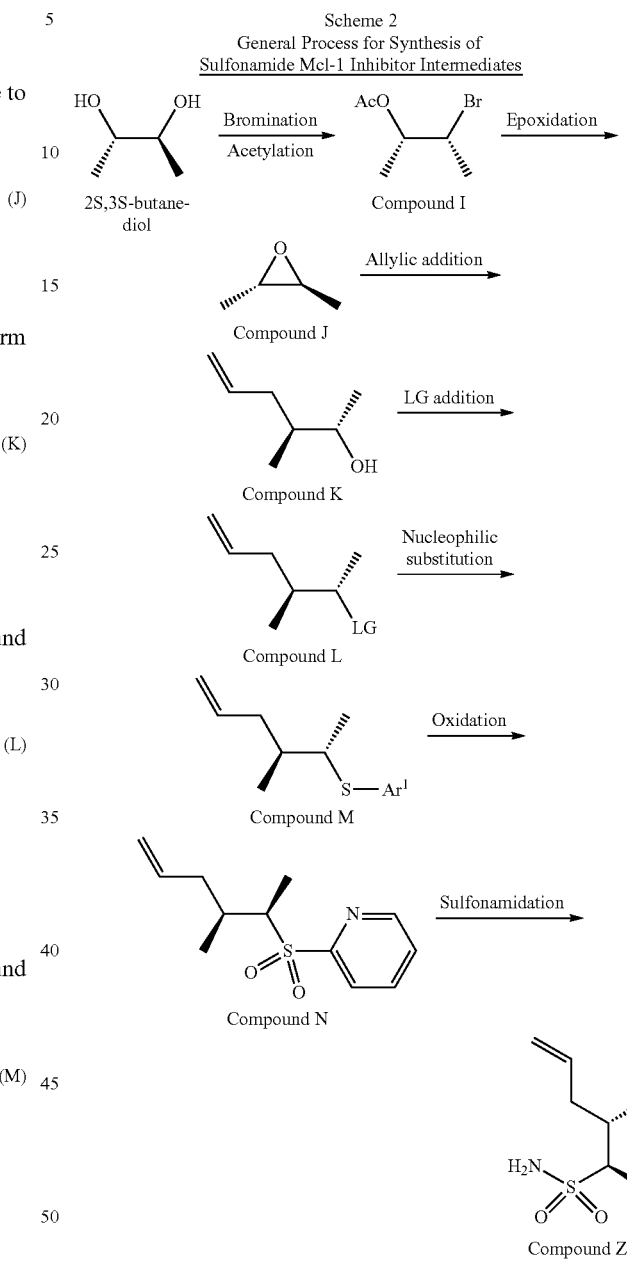

Bromination and Acetylation of 2S,3S-butane-diol to Form Compound I (Step (a))

The processes of the disclosure include bromination and acetylation of 2S,3S-butane-diol to provide compound I, which comprises admixing 2S,3S-butane-diol, a bromide source, and acetic acid.

The term "bromide source" as used herein refers to a bromide source used to replace a hydroxyl group on the butane-diol. In some embodiments, the bromide source herein comprises HBr, $PBr_3$, or a combination thereof. In some embodiments, the bromide source herein comprises HBr.

In some embodiments, the bromide source is provided in a solution of acetic acid. In some embodiments, the bromide source can be present in acetic acid in an amount of 20 w/w % to 50 w/w %. For example, the bromide source can be present in acetic acid in an amount of 25 w/w % to 40 w/w %, 25 w/w % to 35 w/w %, or 30 w/w % to 35 w/w %, such as 20 w/w %, 25 w/w %, 30 w/w %, 32 w/w %, 33 w/w %, 34 w/w %, 35 w/w %, 40 w/w %, 45 w/w %, or 50 w/w %. In some embodiments, HBr can be present in acetic acid. In some embodiments, HBr can be present as a 33 w/w % solution in acetic acid.

2S,3S-Butane-diol and the bromide source can be present in a molar ratio of 1:1 to 1:6, for example, at least a molar ratio of 1:1, 1.05, 1:1.2, 1:1.5, 1:1.75, 1:2, 1:2.25, 1:2.5, 1:3, 1:4 and/or up to 1:6, 1:5, 1:4, 1:3, 1:2.75, 1:2.5, 1:2.25, 1:2, or 1:1.5, such as 1:1 to 1:3.5, 1:2 to 1:4, 1:2 to 1:5, or 1:1.5 to 1:3.5. In some embodiments, the molar ratio of compound I to the non-nucleophilic base is 1:3.5.

The bromination of butane diol can occur at a temperature of −20° C. to 10° C., for example at least −20, −15, −10, −5, 0, 5, or 10 and/or up to 10, 5, 0, or −10, such as −15° C. to 10° C., −10° C. to 10° C., −5° C. to 10° C., or 0° C. to 10° C. In some embodiments, the bromination occurs at a temperature of 10° C.

In some embodiments, the admixing of step (a) can occur for 1 hour to 24 hours. In some embodiments, the admixing of step (a) can occur for 15 hours to 20 hours, or 10 hours to 24 hours, or 12 hours to 24 hours, or 14 hours to 21 hours. For example, the admixing of step (a) can be for 1 hour, 5 hours, 10 hours, 12 hours, 15 hours, 16 hours, 17 hours, 18 hours, 19 hours, 20 hours, or 24 hours.

The bromination/acetylation of the butane diol provides compound I which can be through-processed directly into the next step without the need for substantial purification. As used herein, the term "substantial purification" refers to any purification methods other than washing with solvent and/or distillation, such as, chromatography (e.g., column chromatography), crystallization, filtration, or a combination thereof. In embodiments, neutralization of any remaining acid (e.g., acetic acid and/or HBr) in the formation of compound I can be achieved by admixing with a base, such as potassium carbonate in water, and compound I can be extracted with an organic solvent such as tert-butyl methyl ether (MTBE). In embodiments, extracted compound I can be used in step (b) discussed below, or used after removal of the solvent used for extraction (e.g., "neat").

In some embodiments where compound I is through-processed directly into the next step, compound I can be provided in a solution comprising an organic solvent. Organic solvents are generally known in the art. Nonlimiting examples of organic solvents contemplated include acetonitrile, toluene, benzene, xylene, chlorobenzene, fluorobenzene, naphthalene, benzotrifluoride, tetrahydrofuran (THF), tetrahydropyran, dimethylformamide (DMF), tetrahydrofurfuryl alcohol, diethyl ether, dibutyl ether, diisopropyl ether, methyl tert-butyl ether (MTBE), 2-methyltetrahydrofuran (2-MeTHF), dimethyl sulfoxide (DMSO), 1,2-dimethoxyethane (1,2-DME), 1,2-dichloroethane (1,2-DCE), 1,4-dixoane, cyclopentylmethyl ether (CPME), chloroform, carbon tetrachloride, dichloromethane (DCM), methanol, ethanol, propanol, and 2-propanol. In some embodiments, the organic solvent comprises MTBE. The organic solvent can be present in an amount of 0.1 L/kg of 2S,3S-butane-diol to 10 L/kg of 2S,3S-butane-diol, for example, at least 0.5, 1, 1.5, 2, 3, 5, 7.5 or 10 L/kg of 2S,3S-butane-diol and/or up to 10, 7.5, 5, 3.5, 1.5, or 0.5 L/kg of 2S,3S-butane-diol, such as 1 to 4 L/kg of 2S,3S-butane-diol, 1.5 to 10 L/kg of 2S,3S-butane-diol, or 5 L/kg to 10 L/kg of 2S,3S-butane-diol.

Epoxidation of Compound I to Form Compound J (Step (b))

The processes of the disclosure can include the epoxidation of compound I to provide compound J. The processes herein can comprise synthesizing compound J by admixing compound I, and a non-nucleophilic base to form compound J. As provided herein, compound J has a structure of

(J)

The non-nucleophilic base as used herein can be any suitable non-nucelophilic base known to one of ordinary skill in the art. Contemplated non-nucleophilic bases include, for example, lithium hexamethyldisilazide ("HMDS"), sodium HMDS, potassium HMDS, lithium diisopropylamide, sodium diisopropylamide, potassium diisopropylamide, lithium tert-butoxide, sodium tert-butoxide, potassium tert-butoxide, lithium tert-amylate, sodium tert-amylate, potassium tert-amylate, 2,2,6,6-Tetramethylpiperidine (TMP), LiTMP, 1,1,3,3-tetramethylguanidine (TMG), 1,8-diazabicyclo[5.4.0]undec-7-ene (DBU), 1,5-diazabicyclo[4.3.0]non-5-ene, and any combination thereof. In some embodiments, the non-nucelophilic base comprises lithium tert-butoxide, sodium tert-butoxide, potassium tert-butoxide, or a combination thereof. In some embodiments, the non-nucleophilic base is potassium tert-butoxide. In some embodiments, the non-nucleophilic base is sodium tert-butoxide. In some embodiments, the non-nucleophilic base is sodium tert-amylate. In some embodiments, the non-nucleophilic base is potassium tert-amylate.

Compound I and the non-nucleophilic base can be present in a molar ratio of 1:1 to 1:5, for example, at least a molar ratio of 1:1, 1.05, 1:1.2, 1:1.5, 1:1.75, 1:2, 1:2.25, 1:2.5, 1:3, 1:4 and/or up to 1:5, 1:4, 1:3, 1:2.75, 1:2.5, 1:2.25, 1:2, or 1:1.5, such as 1:1 to 1:2.5, 1:1 to 1:3, 1:1 to 1:4, 1:1.25 to 1:3, or 1:1.1 to 1:2.5. In some embodiments, the molar ratio of compound I to the non-nucleophilic base is 1:2.5.

In some embodiments, step (b) further comprises monoethylene glycol. In some embodiments, step (b) comprises monoethylene glycol and potassium tert-butoxide. In some embodiments, step (b) comprises monoethylene glycol and sodium tert-butoxide.

Monoethylene glycol can be present in an amount of 2 L/kg of compound I to 5 L/kg of compound I, for example, at least 2, 2.5, 3, 5 L/kg of compound I and/or up to 5, 3.5, or 3 L/kg of compound I, such as 2 to 4 L/kg of compound I, 2.5 to 5 L/kg of compound I, or 3 L/kg to 4 L/kg of compound I.

In some embodiments, the admixing of step (b) can occur in an organic solvent. In some embodiments, the organic solvent comprises tert-butyl methyl ether, 2-methyltetrahydrofuran, cyclopentyl methyl ether, dimethoxyethane, or a combination thereof. In some embodiments, the organic solvent comprises tert-butyl methyl ether.

In some embodiments, monoethylene glycol and the non-nucleophilic base are admixed together prior to admixing with compound I. This admixture of monoethylene glycol and the non-nucleophilic base can occur such that the non-nucleophilic base is added to the monoethylene glycol in a manner than maintains the temperature of the resulting admixture to 20° C. to 40° C. In some embodiments, the non-nucleophilic base is added to the monoethylene glycol over 3 to 7 hours, or for 4 to 6 hours. After all the non-nucleophilic base is added to the monoethylene glycol, the admixture can be subjected to a temperature of 70 to 120° C., under reduced pressure (e.g., a pressure of 400 mm Hg), to remove resulting byproduct of the protonated non-nucleophilic base (e.g., if non-nucleophilic base is a t-butoxide, the resulting t-butanol) and leaving behind the deprotonated monoethylene glycol. Compound I can then be added to the deprotonated monoethylene glycol at a temperature of 20° C.-40° C. (e.g., 30° C.), and admixed for 15 minutes to 120 minutes (e.g., 15 minutes to 60 minutes, or for 30 minutes). In some embodiments, the resulting epoxide, compound J, can be distilled from the reaction mixture to isolate.

The epoxidation of compound I provides compound J which can be through-processed directly into the next step without the need for separation.

Allylic Addition to Compound J to Form Compound K (Step (C))

The processes of the disclosure include the allylic addition to compound J to provide compound K. The processes herein can comprise synthesizing compound K by admixing compound J and an allyl nucleophile to form compound K. As provided herein, compound K has a structure of

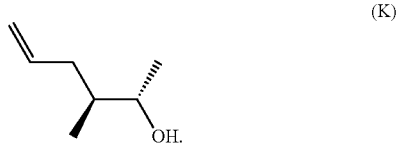

(K)

The allylic nucleophile had a structure of

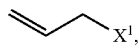

wherein $X^1$ is MgCl, MgBr, MgI, Li, CuLi, $ZnX^3$, In(I), or $In(X^2)_2$; each $X^2$ independently is Cl, Br, or I, and $X^3$ is Cl, Br, I, OTf, OTs, OAc, or acac. In some embodiments, $X^1$ is MgCl, MgBr, or MgI. In some embodiments, $X^1$ is MgCl. In some embodiments, $X^1$ is MgBr or MgI.

In some embodiments, $X^1$ is Li. In some embodiments, $X^1$ is CuLi.

In embodiments, $X^1$ is $ZnX^3$, wherein $X^3$ is Cl, Br, I, OTf, OTs, OAc, or acac. In some embodiments, $X^1$ is ZnCl or ZnBr. In some embodiments, $X^1$ is ZnCl. In some embodiments, $X^1$ is ZnBr. In some embodiments, $X^1$ is ZnOTf or ZnOTs. In some embodiments, $X^1$ is ZnOAc or Zn(acac). In some embodiments, $X^1$ is In(I) or InCl or InBr or InI.

Compound J and the allyl nucleophile can be present in a molar ratio of 1:1.05 to 1:3, for example, at least a molar ratio of 1:1, 1.05, 1:1.2, 1:1.5, 1:1.75, 1:2, 1:2.25, 1:2.5, and/or up to 1:3, 1:2.75, 1:2.5, 1:2.25, 1:2, or 1:1.5, such as 1:1 to 1:2.5, 1:1 to 1:2, 1:1 to 1:3, 1:1.25 to 1:2, or 1:1.1 to 1:3. In some embodiments, the molar ratio of compound J to the allyl nucleophile is 1:1.2.

In some embodiments, the admixing of step (c), the allylic addition, can occur in an organic solvent. In some embodiments, the organic solvent comprises tetrahydrofuran (THF), 2-methyltetrahydrofuran, tert-butyl methyl ether (MTBE), cyclopentyl methyl ether, dimethoxyethane, or a combination thereof. In some embodiments, the organic solvent comprises tert-butyl methyl ether. In some embodiments, the organic solvent comprises THF. In some embodiments, the organic solvent comprises THF and MTBE.

In some embodiments, compound J can be added to the allyl nucleophile dropwise. In some embodiments, compound J is added to the allyl nucleophile dropwise over 1 hour to about 5 hours, such as, over 1 hour, 2 hours, 3 hours, 4 hours or 5 hours. In some embodiments, compound J is added to the allyl nucleophile dropwise over 3 hours.

In some embodiments, after compound J and the allyl nucleophile are combined, the two are admixed for 1 hour to 6 hours, such as 1 hour, 1.5 hours, 2 hours, 2.5 hours, 3 hours, 3.5 hours, 4 hours, 5 hours, or 6 hours. In some embodiments, the admixing of step (c) occurs for 3 hours.

The admixing of step (c) can occur at a temperature of −20° C. to 10° C., for example at least −20, −15, −10, −5, 0, 5, or 10 and/or up to 10, 7, 5, 0, or −10, such as −15° C. to 10° C., −10° C. to 10° C., −5° C. to 10° C., 0° C. to 10° C., or 7° C. to 10° C. In some embodiments, the admixing occurs at a temperature of 7° C. to 10° C.

In some embodiments, the reaction of compound J and the allyl nucleophile can be quenched by adding to a solution of citric acid in water.

The allylic addition provides compound K which can be through-processed directly into the next step without the need for substantial purification.

Leaving Group Addition to Compound K to Form Compound L (Step (d))

The processes of the disclosure includes the leaving group (LG) addition to compound K to provide compound L. The processes herein can comprise synthesizing compound L by admixing compound K, a leaving group reagent, and an amine base to form compound L. As provided herein, compound L has a structure of

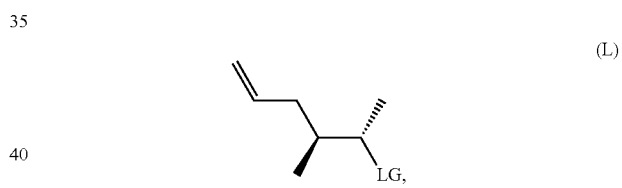

(L)

wherein LG is a leaving group.

Compound K is reacted with a leaving group reagent and an amine base, which converts the hydroxyl group of compound K into a leaving group to form compound L. The leaving group as used herein refers to any suitable atom or functional group that can be displaced by a nucleophile upon nucleophilic substitution. Leaving group reagents that can convert a hydroxyl group to a leaving group to make nucleophilic substitution favorable are well known in the art. Nonlimiting examples of suitable leaving groups include halides, such as F, Cl, Br, or I, or sulfonyls.

In some embodiments, LG is a sulfonyl leaving group. As used herein, the term "sulfonyl leaving group" refers to a leaving group in which the oxygen atom of a hydroxyl group is bound to a sulfonyl group-

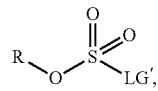

where R—O is derived from the hydroxyl group being converted to a leaving group and LG' is derived from the rest of the sulfonyl leaving group. In some embodiments, the sulfonyl leaving group is selected from the group consisting of mesyl, tosyl, nosy, and triflyl. In some embodiments, the sulfonyl leaving group comprises mesyl.

In general, the leaving group reagent can be any suitable leaving group reagent known to one of ordinary skill in the art as is used to convert a hydroxyl group to a leaving group. In some embodiments, the leaving group reagent can comprise mesyl chloride.

Compound K and the leaving group reagent can be present in a molar ratio of 1:1.2 to 1:2, for example, at least a molar ratio of 1:1.2, 1:1.5, 1:1.6 and/or up to 1:2, 1:1.75, 1:1.5, such as 1:1.2 to 1:1.9, 1:1.2 to 1:7, or 1:1.2 to 1:1.5. In some embodiments, the molar ratio of compound K and the leaving group reagent is 1:1.4.

The admixing of step (d) can include an amine base (e.g., mono-, di-, or trialkylamines, substituted or unsubstituted piperidines, substituted or unsubstituted pyridines). In some embodiments, the amine base comprises pyridine, trimethylamine, triethylamine, aniline, diisopropylethylamine, 1,8-diazabicyclo [5.4.0] undec-7-ene (DBU), 1,4-diazabicyclo [2.2.2] octane (DABCO), 2,6-lutidine, or a combination thereof. In some embodiments, the amine base is triethylamine.

Compound K and the amine base can be present in a molar ratio of 1:1.8 to 1:3.3, for example, at least a molar ratio of 1:1.8, 1:2, 1:2.5 and/or up to 1:3.3, 1:3, 1:2.5, such as 1:1.8 to 1:3, 1:2 to 1:3, or 1:2 to 1:2.5. In some embodiments, the molar ratio of compound K and the leaving group reagent is 1:2.3.

In some embodiments, the admixing of step (d), the leaving group addition, can occur in an organic solvent comprising dichloromethane, tetrahydrofuran, 2-methyltetrahydrofuran, tert-butyl methyl ether, or a combination thereof. In some embodiments, the organic solvent comprises tert-butyl methyl ether. In some embodiments, the organic solvent comprises THF. In some embodiments, the organic solvent does not comprise dichloromethane.

In some embodiments, the leaving group reagent can be added slowly to a solution of compound K and the amine base. In some embodiments, the leaving group reagent is added to the solution of compound K and the amine base over 2 hours to 3 hours, such as, over 2 hours, 2.5 hours, or 3 hours. In some embodiments, the leaving group reagent is added to the solution of compound K and the amine base over 2 hours to 3 hours and then stirred for 10 minutes to an hour. In some embodiments, the leaving group reagent is added to the solution of compound K and the amine base over 2.5 hours. In some embodiments, the leaving group reagent is added to the solution of compound K and the amine base over 2.5 hours and then stirred for 30 minutes.

The admixing of step (d) can occur at a temperature of −10° C. to 10° C., for example at least −10, −5, 0, or 5 and/or up to 10, 7, 5, 0, or −10, such as −10° C. to 5° C., −10° C. to 0° C., −5° C. to 10° C., 0° C. to 10° C. In some embodiments, the admixing occurs at a temperature of 5° C.

The leaving group addition provides compound L which can be through-processed directly into the next step without the need for substantial purification.

Nucleophilic Substitution of Compound L to Form Compound M (Step (e))

The processes of the disclosure include the nucleophilic substitution of compound L to provide compound M. The processes herein comprise synthesizing compound M by admixing compound L, a non-nucleophilic base, and $Ar^1$—SH to form compound M. As provided herein, compound M has a structure of

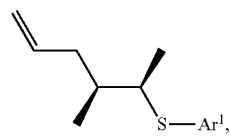

wherein $Ar^1$ is a 5-12 membered heteroaryl comprising from 1 to 3 ring heteroatoms selected from O, N, and S.

As used herein, the term "heteroaryl" refers to a cyclic aromatic ring having five to twelve total ring atoms (e.g., a monocyclic aromatic ring with 5-6 total ring atoms), and containing one to three heteroatoms selected from nitrogen, oxygen, and sulfur in the aromatic ring. Unless otherwise indicated, a heteroaryl group can be unsubstituted or substituted with one or more, and in particular one to four, substituents selected from, for example, halo, alkyl, alkenyl, $OCF_3$, $NO_2$, CN, NC, OH, alkoxy, amino, $CO_2H$, $CO_2alkyl$, aryl, and heteroaryl. In some cases, the heteroaryl group is substituted with one or more of alkyl and alkoxy groups. Heteroaryl groups can be isolated (e.g., pyridyl) or fused to another heteroaryl group (e.g., purinyl), a cycloalkyl group (e.g., tetrahydroquinolinyl), a heterocycloalkyl group (e.g., dihydronaphthyridinyl), and/or an aryl group (e.g., benzothiazolyl and quinolyl). Examples of heteroaryl groups include, but are not limited to, thienyl, fury, pyridyl, pyrrolyl, oxazolyl, quinolyl, thiophenyl, isoquinolyl, indolyl, triazinyl, triazolyl, isothiazolyl, isoxazolyl, imidazolyl, benzothiazolyl, pyrazinyl, pyrimidinyl, thiazolyl, and thiadiazolyl. When a heteroaryl group is fused to another heteroaryl group, then each ring can contain five or six total ring atoms and one to three heteroatoms in its aromatic ring.

In some embodiment, $Ar^1$ is selected from the group consisting of

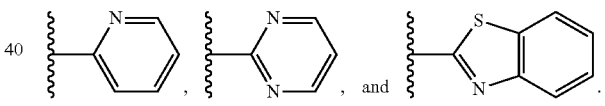

In some embodiments, $Ar^1$ is

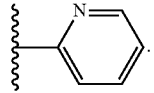

Compound L and $Ar^1$—SH can be present in a molar ratio of 1:1.05 to 1:2.5, for example, at least a molar ratio of 1:1.05, 1:1.25, 1:1.5, 1:1.6 and/or up to 1:2.5, 1:2, 1:1.75, 1:1.5, such as 1:1.05 to 1:2.25, 1:1.1 to 1:2, or 1:1.05 to 1:1.2. In some embodiments, the molar ratio of compound L and $Ar^1$—SH is 1:1.08.

The non-nucleophilic base as used herein can be any suitable non-nucelophilic base known to one of ordinary skill in the art. Suitable non-nucleophilic bases can include, for example, lithium hexamethyldisilazide ("HMDS"), sodium HMDS, potassium HMDS, lithium diisopropylamide, sodium diisopropylamide, potassium diisopropylamide, lithium tert-butoxide, sodium tert-butoxide, potassium tert-butoxide, lithium tert-amylate, sodium tert-amylate, potassium tert-amylate, 2,2,6,6-Tetramethylpiperidine (TMP), LiTMP, 1,1,3,3-tetramethylguanidine (TMG), 1,8-diazabicyclo[5.4.0]undec-7-ene (DBU), 1,5-diazabicyclo[4.3.0]non-5-ene, and any combination thereof. In some embodiments, the non-nucleophilic base comprises lithium hexamethyldisilazide ("HMDS"), sodium HMDS, potassium HMDS, lithium diisopropylamide, sodium diisopropylamide, potassium diisopropylamide, lithium tert-butoxide, sodium tert-butoxide, potassium tert-butoxide, lithium tert-amylate, sodium tert-amylate, potassium tert-amylate, or a combination thereof. In some embodiments, the non-nucleophilic base comprises sodium tert-butoxide, potassium tert-butoxide, or sodium tert-amylate.

Compound L and the non-nucleophilic base can be present in a molar ratio of 1:1.1 to 1:4, for example, at least a molar ratio of 1:1.1, 1:1.2, 1:1.5, 1:2, 1:2.5 and/or up to 1:4, 1:3.5, 1:3, 1:2.5, such as 1:1.1 to 1:3, 1:1.1 to 1:2, or 1:1.1 to 1:1.3. In some embodiments, the molar ratio of compound L and the non-nucleophilic base is 1:1.2.

In some embodiments, the admixing of step (e), can occur in an organic solvent comprising tetrahydrofuran, 2-methyltetrahydrofuran, tert-butyl methyl ether, toluene, or a combination thereof. In some embodiments, the organic solvent comprises THF.

The organic solvent can be present in an amount of 10 L/kg of compound L to 25 L/kg of compound L, for example, at least 10, 15, 20 L/kg of compound L and/or up to 25, 20, or 15 L/kg of compound L, such as 10 to 20 L/kg of compound L, 10 to 15 L/kg of compound L, or 15 L/kg to 22 L/kg of compound L.

In some embodiments, compound L can be added slowly to a mixture comprising $Ar^1$—SH and the non-nucleophilic base. In some embodiments, compound L is added dropwise to a mixture comprising $Ar^1$—SH and the non-nucleophilic base over 3 hours to 6 hours, such as, over 3 hours, 3.5 hours, 4 hours, 5 hours, 5.5 hours, or 6 hours. In some embodiments, compound L is added dropwise to a mixture comprising $Ar^1$—SH and the non-nucleophilic base over 5 hours.

In some embodiments, the admixing of step (e) occurs for 3 hour to 5 hours, such as 3 hour, 3.5 hours, 4 hours, 4.5 hours, or 5 hours. In some embodiments, the admixing of step (e) occurs for 4 hours.

The admixing of step (e) can occur at a temperature of 60° C. to 80° C., for example at least 60 or 65° C. and/or up to 80, 75, 70, or 68, such as 60° C. to 75° C., 65° C. to 75° C., or 65° C. to 80° C. In some embodiments, the admixing occurs at a temperature of 68° C.

Formation of compound M in step (e) can be through-processed directly into the next step without the need for substantial purification. In some embodiments, compound M is washed three to five times with aqueous sodium hydroxide prior to the oxidizing of step (f). Advantageously, washing compound M three to five times (e.g., five times) removes residual $Ar^1$—SH, resulting in improved purity profile and yield, as well as avoiding further purification (e.g., chromatographic purification).

Oxidation of Compound M to Form Compound N (Step (f))

The processes of the disclosure include the oxidation of compound M to provide compound N. The oxidizing includes admixing compound M and an oxidizing agent to form compound N. As provided herein, compound N has a structure of

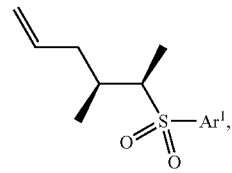

(N)

wherein $Ar^1$ is as defined above.

Suitable oxidizing agents are generally known in the art. Nonlimiting examples of oxidizing agents include peracids such as m-chloroperbenzoic acid (mCPBA), hydrogen peroxide, tert-butyl hydroperoxide and the like; perchlorates such as tetrabutylammonium perchlorate and the like; chlorates such as sodium chlorate and the like; chlorites such as sodium chlorite and the like; hypochlorites such as bleach and the like, periodates such as sodium periodate and the like; a high-valent iodine reagent such as iodosylbenzene, iodobenzenediacetate, and the like; a reagent having manganese, such as manganese dioxide, potassium permanganate and the like; leads such as lead tetraacetate and the like; a reagent having chromium, such as pyridinium chlorochromate (PCC), pyridinium dichromate (PDC), Jones reagents and the like; halogen compounds such as N-bromosuccinimide (NBS) and the like; oxygen; ozone; a sulfur trioxide-pyridine complex; osmium tetroxide; selenium dioxide; 2,3-dichloro-5,6-dicyano-1,4-benzoquinone (DDQ). In some embodiments, the oxidizing agent is hydrogen peroxide.

Compound M and the oxidizing agent can be present in a molar ratio of 1:1.3 to 1:5, for example at least 1:1.3, 1:1.5, 1:2, or 1:3 and/or up to 1:3, 1:2, 1:1.8, or 1:1.5, such as 1:1.3 to 1:4, 1:1.3 to 1:3, 1:1.3 to 1:2, or 1:1.3 to 1:1.8. In some embodiments, the molar ratio of compound M to the oxidizing agent is 1:1.5.

The oxidation of compound M can further include admixing compound M and the oxidizing reagent with an oxidation catalyst. Nonlimiting examples of oxidation catalysts include 2,2,6,6-tetramethylpiperidin-1-yl)oxidanyl (TEMPO), tetrapropylammonium perruthenate (TPAP), 9-azabicyclo[3.3.1]nonane N-oxyl (ABNO), metal catalysts (e.g., copper, iron, etc.), 2-azaadamantane-N-oxyl, 1-methyl-2-azaadamantane-N-oxyl, 1,3-dimethyl-2-azaadamantane-N-oxyl, 4-acetamido-2,2,6,6-tetramethylpiperidine-1-oxoammonium tetrafluoroborate, sodium tungstate dehydrate, and 3-chloroperbenzoic acid. In some embodiments, the oxidation catalyst is sodium tungstate dehydrate, 3-chloroperbenzoic acid, or a combination thereof. In some embodiments, the oxidation catalyst, is sodium tungstate dehydrate. In some embodiments, the admixing of step (f) can comprise hydrogen peroxide and sodium tungstate dehydrate.

When the oxidation catalyst is present, compound M and the oxidation catalyst can be present in a molar ratio of 1:0.05 to 1:0.5, for example, at least 1:0.05, 0.04, 1:0.1, 1:0.2, 1:0.3, or 1:0.5 and/or up to 1:0.5, 1:0.4, 1:0.3, 1:0.2, or 1:0.1, such as 1:0.05 to 1:0.4, 1:0.05 to 1:0.3, or 1:0.05 to 1:0.2. In some embodiments, the molar ratio of compound M to the oxidation catalyst is 1:0.1.

In some embodiments, the oxidizing of step (f) further comprises acetic acid. Advantageously, when acetic acid is admixed in the oxidation step, the acetic acid can enhance safety by allowing lower amounts of hydrogen peroxide to be used, improve the purity profile of compound N, and increases conversion to product because the acetic acid stabilizes the hydrogen peroxide reagent.

In some embodiments, the oxidizing of step (f), the oxidation reaction, can occur in a solvent, such as, an alcohol solvent (e.g., methanol, ethanol, isopropanol). In some embodiments, the solvent is methanol.

In some embodiments, the oxidizing of step (f) occurs for 12 hours to 48 hours, such as 12 hour, 15 hours, 20 hours, 24 hours, 30 hours, 35 hours, 40 hours, or 48 hours. In some embodiments, the admixing of step (f) occurs for 24 hours.

In some embodiments, the oxidizing of step (f) can occur at a temperature that is maintained at 25° C.±5° C. In some embodiments, the oxidizing of step (f) occurs at a temperature of 20° C. to 25° C.

In some embodiments, compound N can be crystallized from oxidizing of step (f). In some embodiments, crystallization of compound N can occur by adding water to the oxidizing of step (f). Advantageously, crystallization of compound N occurs by addition of water to the oxidizing of step (f), wherein the direct crystallization prior to extraction of compound N improves throughput and yield, as well as improving the purity profile of the reaction mixture.

Sulfonamidation of Compound N to Form Compound Z

The processes of the disclosure include the sulfonamidation of compound N to provide compound Z, step (g). The sulfonamidation includes admixing compound N, a base, and hydroxylamine-O-sulfonic acid to form compound Z. As provided herein, compound Z has a structure of

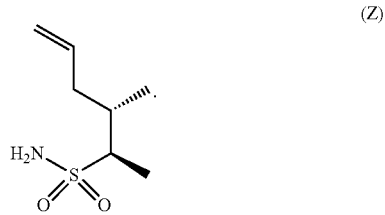

(Z)

In some embodiments, compound N and a base are admixed together in a solvent to form an intermediate compound O prior to admixing with hydroxylamino-O-sulfonic acid. As provided herein, compound O has a structure of

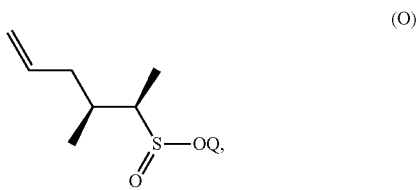

(O)

wherein Q is an alkali metal cation. In some embodiments, Q is lithium, sodium potassium, or a combination thereof. In some embodiments, Q is sodium. In some embodiments, the admixing of compound N and a base occurs in a solvent. In some embodiments, the solvent comprises tert-butyl methyl ether, methanol, tetrahydrofuran, 2-methyltetrahydrofuran, or a combination thereof. In some embodiments, the solvent comprises tert-butyl methyl ether and methanol.

In some embodiments, the base comprises sodium thiomethoxide, sodium methoxide, potassium carbonate and methanol, or a combination thereof. In some embodiments, the base comprises sodium thiomethoxide.

In some embodiments, the admixing of compound N and the base occurs for 6 hours to 18 hours, such as 6 hours, 8 hours, 10 hours, 12 hour, 14 hours, 15 hours, or 18 hours. In some embodiments, the admixing of compound N and the base occurs for 12 hours.

In some embodiments, the admixing of compound N and the base can occur at a temperature of 25° C. to 50° C., for example at least 25, 30, 35, 40° C. and/or up to 50, 45, 40, or 35° C., such as 25° C. to 45° C., 30° C. to 45° C., or 30° C. to 40° C. In some embodiments, the admixing of compound N and the base occurs at a temperature of 35° C.

In some embodiments, the admixing of compound N and the base provides the intermediate compound O which can be through-processed directly in to the addition of hydroxylamine-O-sulfonic acid without the need for substantial purification. In some embodiments, hydroxylamine-O-sulfonic acid is added with sodium acetate, potassium acetate, sodium formate, potassium formate, or a combination thereof, to the intermediate compound O. In some embodiments, hydroxylamine-O-sulfonic acid is added with sodium acetate to the intermediate compound O. In some embodiments, hydroxylamine-O-sulfonic acid is added with sodium acetate trihydrate to the intermediate compound O.

In some embodiments, the admixing of the intermediate compound O, hydroxylamine-O-sulfonic acid, and sodium acetate occurs in a solvent. In some embodiments, the solvent comprises tert-butyl methyl ether, methanol, 2-methyltetrahydrofuran, or a combination thereof. In some embodiments, the solvent comprises tert-butyl methyl ether and methanol. In some embodiments, the solvent can be a biphasic mixture. In some embodiments, the biphasic mixture comprises water and an organic solvent, such as tert-butyl methyl ether.

In some embodiments, the admixing of the intermediate compound O, hydroxylamine-O-sulfonic acid, and sodium acetate occurs for 30 minutes to 4 hours, such as 30 minutes, 1 hours, 1.5 hours, 2 hours, 2.5 hours, 3 hours, 3.5 hours or 4 hours. In some embodiments, the admixing of the intermediate compound 0, hydroxylamine-O-sulfonic acid, and sodium acetate occurs for 2 hours.

In some embodiments, the admixing of the intermediate compound O, hydroxylamine-O-sulfonic acid, and sodium acetate can occur at a temperature of 25° C. to 50° C., for example at least 25, 30, 35, 40° C. and/or up to 50, 45, 40, or 35° C., such as 25° C. to 45° C., 30° C. to 45° C., or 30° C. to 40° C. In some embodiments, the admixing of the intermediate compound 0, hydroxylamine-O-sulfonic acid, and sodium acetate occurs at a temperature of 35° C.

In some embodiments, compound Z can be crystallized from the sulfonamidation of step (g). In some embodiments, crystallization of compound Z comprises heating a solution of compound Z, then cooling the solution and adding a crystallizing solvent to the cooled solution to form crystals of compound Z. In some embodiments, the crystallizing comprises heating a solution of compound Z to 40° C. to 45° C., then cooling the solution to 10° C. to 15° C. and adding a crystallizing solvent to the cooled solution to form crystals of compound Z. In some embodiments, the solution of compound Z comprises tert-butyl methyl ether and the crystallizing solvent comprises heptane. In some embodiments, the solution of compound Z comprises methanol and the crystallizing solvent comprises water. Advantageously, crystallization of compound Z comprises heating a solution of compound Z to 40° C. to 45° C., which prevents compound Z from melting, provides a controlled crystallization, increases the yield, and improves the impurity profile. Further, the crystallization of compound Z comprises heating a solution of compound Z to 40° C. to 45° C. which increases purity of the product, removes chiral impurities, and rejects the crystallization of alternative chiral impurities. The crystallization of compound Z advantageously purifies the product without chromatography and its associated yield loss.

Compound Z, prepared by the processes disclosed herein, can be used to synthesize compounds A1 and A2. As shown in Scheme 3, compound Z may be used to synthesize compound A1 and salts and solvates thereof and as shown in Scheme 4, compound Z may also be used to synthesize compound A2 and salts and solvates thereof.

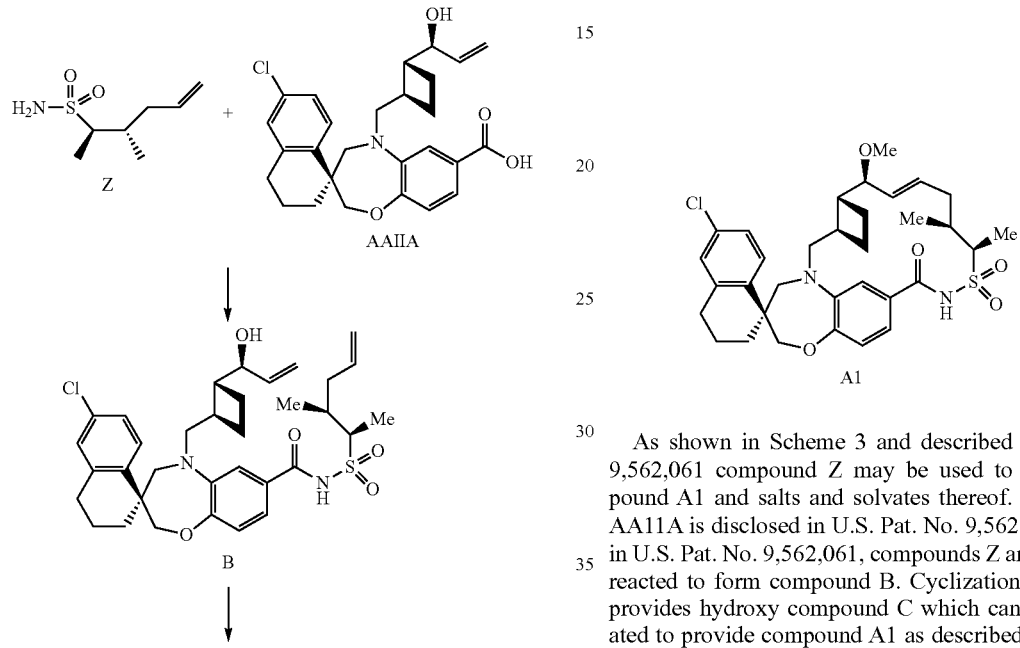

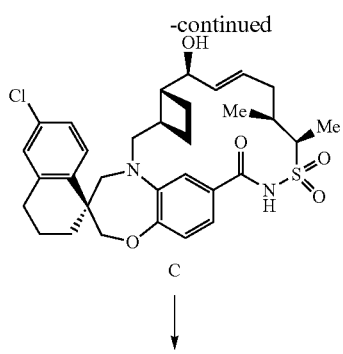

As shown in Scheme 3 and described in U.S. Pat. No. 9,562,061 compound Z may be used to synthesize compound A1 and salts and solvates thereof. The synthesis of AA11A is disclosed in U.S. Pat. No. 9,562,061. As set forth in U.S. Pat. No. 9,562,061, compounds Z and AA11A can be reacted to form compound B. Cyclization of compound B provides hydroxy compound C which can then be methylated to provide compound A1 as described in U.S. Pat. No. 9,562,061.

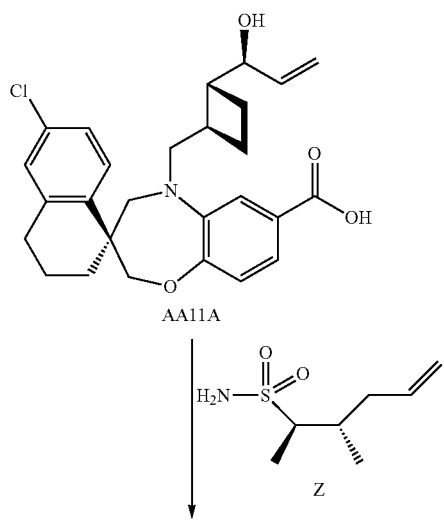

-continued

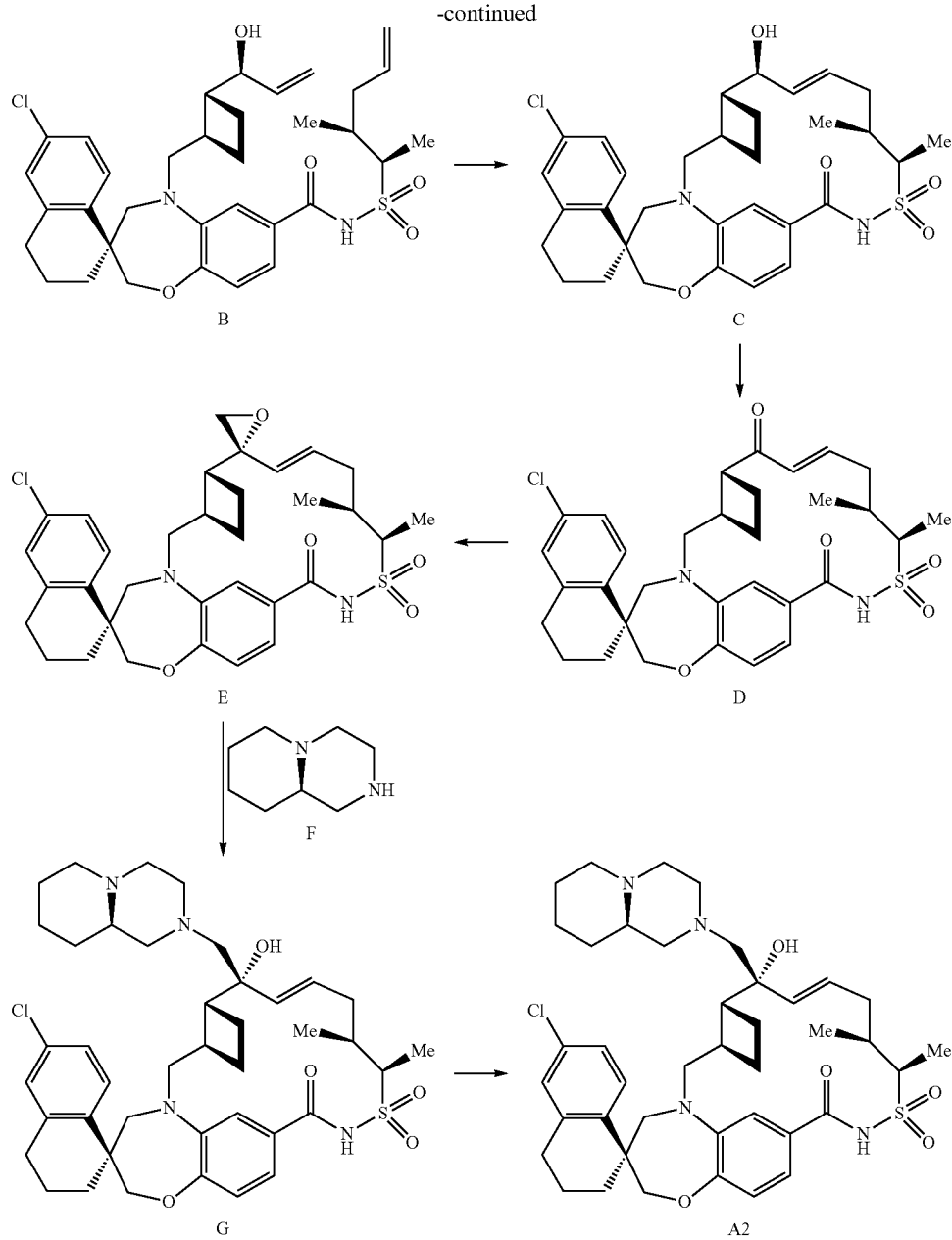

As shown in Scheme 4 and described in U.S. Pat. No. 10,300,075, compound Z may be used to synthesize compound A2 and salts and solvates thereof. As described above with respect to Scheme 3, the synthesis of AA11A is disclosed in U.S. Pat. No. 9,562,061. As described above and set forth in U.S. Pat. No. 9,562,061 sulfonamide Z and AA11A can be reacted to form compound B which can be cyclized to product hydroxy compound C.

Compound C can then be oxidized to provide cyclic enone D as disclosed in U.S. Pat. No. 10,300,075. Alternatively, compound B can be oxidized to provide the uncyclized enone version of compound C and then cyclized to provide cyclic enone D. Enone D can then be converted to epoxide E using the procedures disclosed in U.S. Pat. No. 10,300,075. Epoxide E can then be reacted with bicyclic compound F to provide hydroxy compound G. Finally, methylation of compound G provides compound A2 as disclosed in U.S. Pat. No. 10,300,075.

It is to be understood that while the disclosure is read in conjunction with the detailed description thereof, the foregoing description and following example are intended to illustrate and not limit the scope of the disclosure, which is defined by the scope of the appended claims. Other aspects, advantages, and modifications are within the scope of the following claims.

EXAMPLES

The following examples are provided for illustration and are not intended to limit the scope of the invention.

Example 1: Formation of Compound Z

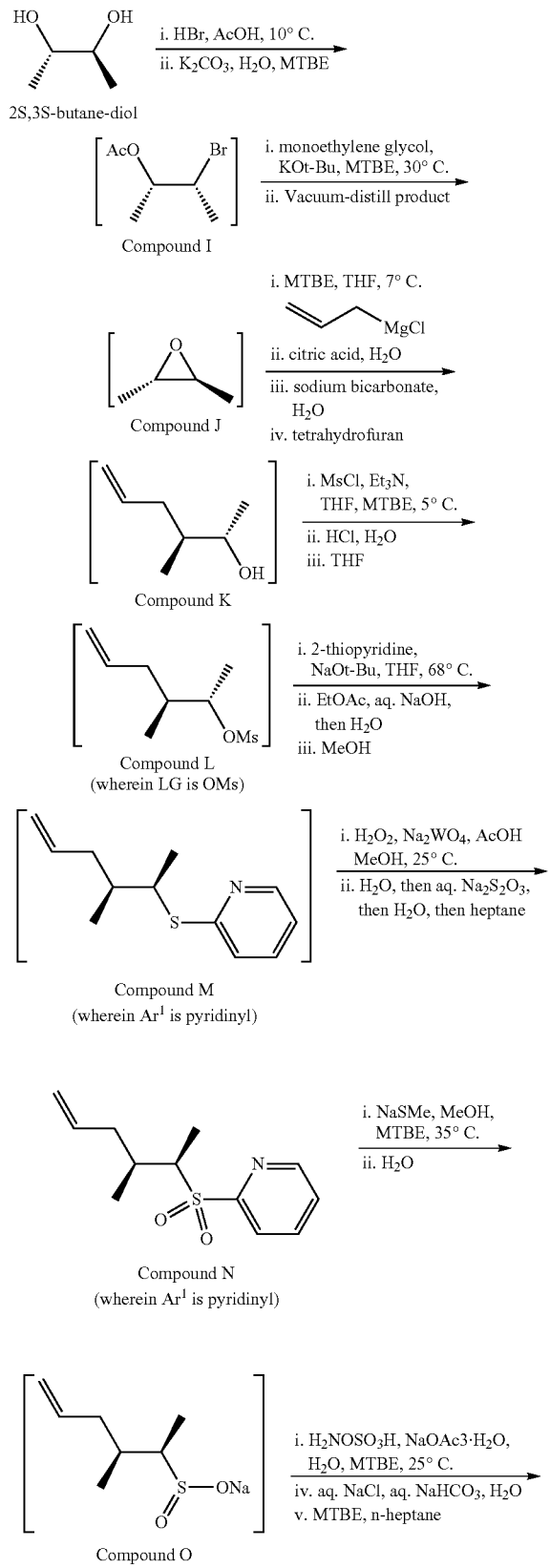

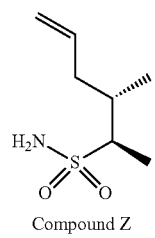

Compound Z

Synthesis of Compound 1

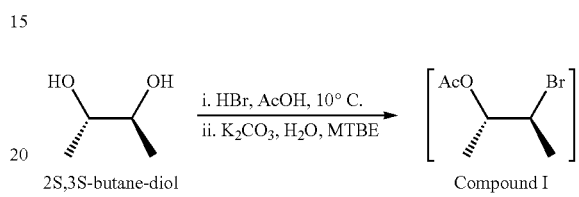

(2S,3R)-3-bromobutan-2-yl acetate (Compound I): To a 20 L glass lined, jacketed reactor was charged hydrogen bromide (33% w/w solution in acetic acid; 3.5 kg, 14.3 mol, 3.5 equiv.). The solution was cooled to +10° C., and (2S, 3S)-butane-2,3-diol (368 g, 4.08 mol, 1.0 equiv.) was added slowly while maintaining temperature no more than +10° C. (NMT +10° C.). The mixture was stirred at +10° C. for 15-20 h. The reaction mixture was then added slowly to a pre-cooled stirring solution of potassium carbonate (1.84 kg, 3.26 equiv.) in water (3.68 L, 10.0 L/kg) over 8 hours, maintaining the temperature less than +10° C. The mixture was diluted with tert-butyl methyl ether (1.84 L, 5.00 L/kg), warmed to +20 to +25° C., and stirred at least 30 min. The phases were separated and the resulting aqueous layer was washed with tert-butyl methyl ether (1.10 L, 3.00 L/kg). The combined organic layers were washed with a solution of potassium carbonate (644 g, 1.14 equiv.) in water (2.4 L, 6.5 L/kg). The organic layer was washed with water (740 mL, 2.0 L/kg) and distilled under reduced pressure at +45° C. At the end of distillation, the solution was sampled to confirm low water content, and diluted with tert-butyl methyl ether to ~1.10 L total volume (3 L/kg). Potency-adjusted assay yield was 95-97%, typical GC-purity was >95.0 Area %. The resulting solution of compound I in tert-methyl methyl ether was suitable for use directly in the next step of the process.

A sample of compound I was concentrated in vacuo for characterization by NMR. $^1$H NMR (300 MHz, CDCl$_3$) □□4.84-4.78 (m, 1H), 4.16-4.04 (m, 1H), 1.96 (s, 3H), 1.55 (d, J=7.1 Hz, 3H), 1.21 (d, J=6.9 Hz, 3H); LRMS (ESI): Calcd. for C$_6$H$_{11}$Br$_1$O$_2$+Na: 217.0, found: 217.0.

Synthesis of Compound J

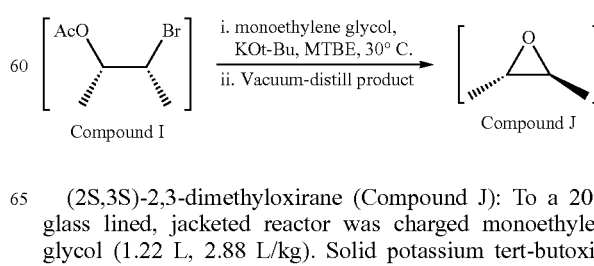

(2S,3S)-2,3-dimethyloxirane (Compound J): To a 20 L glass lined, jacketed reactor was charged monoethylene glycol (1.22 L, 2.88 L/kg). Solid potassium tert-butoxide (612 g, 5.45 mol, 2.50 equiv.) was added portion-wise over ~5 h, maintaining the temperature below +40° C. The resulting mixture was distilled under reduced pressure at +90-120° C., removing approximately 500 mL of tert-butanol. Solvent tert-butyl methyl ether (2.13 L, 5.0 L/kg) was added, and the mixture was distilled under reduced pressure until the tert-butanol content was measured below 0.4% wt/wt by GC. After cooling to +30° C., a solution of compound I (425 g, 2.18 mol, 1.0 equiv.) in tert-butyl methyl ether (425 mL, 1.00 L/kg) was added over 30 min, followed with washing the line with tert-butyl methyl ether (425 mL, 1.00 L/kg). The resulting mixture was stirred for 30 min at +30° C. The reaction mixture was distilled directly under reduced pressure (condenser setting −15° C.). The product compound J was obtained in 75-80% potency-adjusted yield, with typical GC-purity>98.0 Area %. The resulting solution of SS-DMO, containing residual tert-butyl methyl ether, was suitable for use directly in the next step of the process.

$^1$H NMR (300 MHz, CDCl$_3$) □□2.64-2.58 (m, 2H), 1.19-1.15 (m, 6H).

Synthesis of Compound K

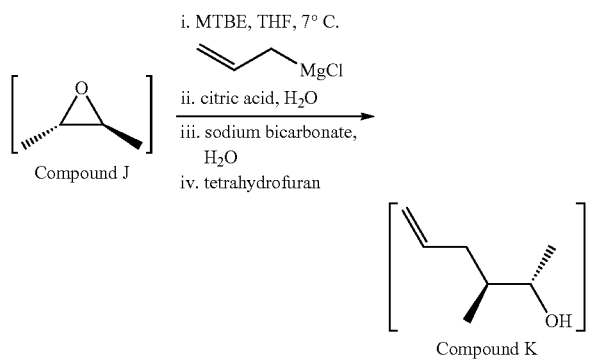

Compound J

Compound K (2S,3S)-3-methylhex-5-en-2-ol (Compound K): To a 20 L glass lined, jacketed reactor was charged allylmagnesium chloride solution in tetrahydrofuran (18% w/w solution, 7.28 mol, 1.20 equiv.) and cooled to +7 to +10° C. A solution of compound J (438 g, 6.07 mol, 1.00 equiv.) in tert-butyl methyl ether (657 mL, 1.5 L/kg) was added dropwise over 3 h, maintaining the temperature below +7° C. The reaction was stirred at +7 to +10° C. for another 3 h. The reaction mixture was added dropwise over 2 to 3 h to a pre-cooled stirred solution of citric acid monohydrate (1.68 kg, 7.89 mol, 1.3 equiv.) in water (3.50 L, 8.00 L/kg), maintaining the temperature at +5 to +10° C. The resulting mixture was warmed to +25° C. and stirred for 30 min. The phases were separated, and the aqueous layer was washed two times with tert-butyl methyl ether (2×876 mL, 2×2.00 L/kg). The organic layers were combined, washed two times with aqueous sodium bicarbonate solution (0.8 mol/L solution; 2×2.63 L, 2×6.0 L/kg), and then washed two times with aqueous sodium chloride solution (5.3 mol/L solution; 2×876 mL, 2×2.0 L/kg). The organic layer was distilled under reduced pressure at +30° C. to a total volume of 1.3 L (3.0 L/kg). Three times, solvent tetrahydrofuran (3×1.3 L, 3×3.0 L/kg) was added, and the mixture was distilled under reduced pressure at +30° C. to a final volume of 1.3 L (3.0 L/kg). Potency-adjusted assay yield was 90-95%, typical GC-purity was >88.0 Area %. The resulting solution of compound K in tetrahydrofuran was suitable for use directly in the next step of the process.

A sample of compound K was concentrated in vacuo for characterization by NMR. $^1$H NMR (300 MHz, CDCl$_3$) □□5.81-5.67 (m, $^1$H), 5.02-4.89 (m, 2H), 3.70-3.63 (m, $^1$H), 2.22-2.10 (m, $^1$H), 1.90-1.75 (m, 2H), 1.15 (d, J=7.0 Hz, 3H), 0.82 (d, J=6.9 Hz, 3H). LRMS (ESI): Calcd. for C$_7$H$_{14}$O$_1$Na: 137.1, found: 137.1.

Synthesis of Compound L (Wherein LG is OMs)

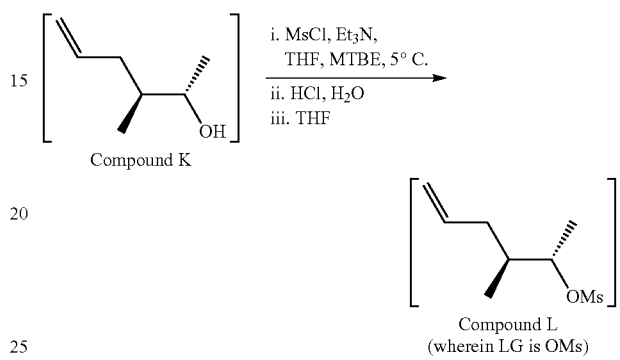

Compound K

Compound L
(wherein LG is OMs)

(2S,3S)-3-methylhex-5-en-2-yl methanesulfonate (Compound L, wherein LG was OMs): To a 20 L glass lined, jacketed reactor were charged a solution of compound K (717 g, 4.97 mol, 1.00 equiv.) in tetrahydrofuran (700 mL, 1.0 L/kg) and solvent tert-butyl methyl ether (5.7 L, 8.0 L/kg). The mixture was cooled to 0° C. and triethylamine (2.01 L, 11.4 mol, 2.30 equiv.) was charged, followed by tert-butyl methyl ether (700 mL, 1 L/kg). At 0 to +5° C., methanesulfonyl chloride (680 mL, 6.96 mol, 1.40 equiv.) was added slowly over 2.5 h. The reaction was stirred at +5° C. for 30 min. Aqueous hydrochloric acid (1 mol/L solution; 5.0 L, 7.0 L/kg, 1.0 equiv.) was then added over 30 min, at <15° C. The biphasic mixture was warmed to +25° C. and stirred to 6 h and then the phases were separated. The aqueous phase was extracted with tert-butyl methyl ether (2.9 L, 4.0 L/kg). The combined organic phases were washed with aqueous hydrochloric acid (1 mol/L solution; 2.9 L, 4.0 L/kg, 0.6 equiv.), washed twice with aqueous sodium chloride (5.7 mol/L solution; 2×1.4 L, 2×3.0 L/kg), and washed with water (1.4 L, 2.0 L/kg). The organic phase was distilled under reduced pressure to 2.9 L (4.0 L/kg) total volume. Tetrahydrofuran (2.9 L, 4.0 L/kg) was added, and the mixture was distilled again under reduced pressure to 2.9 L (4.0 L/kg) total volume. Potency-adjusted assay yield was 93-97%, typical GC-purity was >98.0 Area %. The resulting solution of compound L (wherein LG is OMs) in tetrahydrofuran was suitable for use directly in the next step of the process.

Synthesis of Compound M (Wherein Ar$^1$ is pyridinyl)

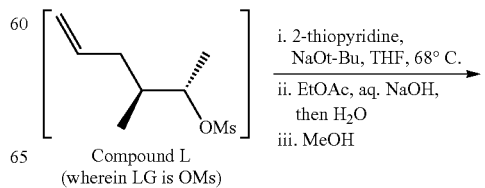

Compound L
(wherein LG is OMs)

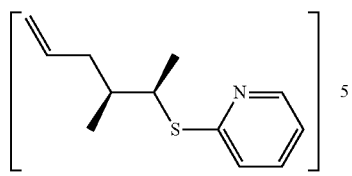

Compound M
(wherein Ar[1] is pyridinyl)

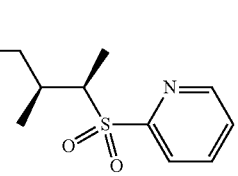

Compound N
(wherein Ar[1] is pyridinyl)

2-(((2R,3S)-3-methylhex-5-en-2-yl)thio)pyridine (Compound M, wherein Ar[1] is pyridinyl): To a 20 L glass lined, jacketed reactor were charged 2-thiopyridine (637 g, 5.73 mol, 1.08 equiv.) and tetrahydrofuran (10.0 L, 9.0 L/kg), and the resulting mixture was stirred for 30 min at 15° C. Sodium tert-butoxide (612 g, 6.37 mol, 1.20 equiv.) was added in portions over 1 h, maintaining the temperature NMT +30° C. After the addition, the reaction mixture was heated to gently reflux at +68° C. over 1 h. At this temperature, a solution of compound L (wherein LG is OMs) (1,020 g, 5.31 mol, 1.00 equiv.) in tetrahydrofuran (1.0 L, 1.0 L/kg) was added dropwise over 5 h. The reaction was stirred for another 4 h. The reaction mixture was distilled at atmospheric pressure at +65 to +75° C. to remove approximately 6 L of solvent. The mixture was cooled to +20° C. and water (3.0 L, 3.0 L/kg) and ethyl acetate (5.0 L, 5.0 L/kg) were added. The mixture was stirred for 30 min at +25° C. until all solids dissolve. The layers are separated and the aqueous layer was extracted with ethyl acetate (3.0 L, 3.0 L/kg). The combined organic phases were washed five times with aqueous sodium hydroxide (1 mol/L solution; 5×2.2 L, 5×2.2 L/kg), then one time with water (4.0 L, 4.0 L/kg). The organic layer was vacuum distilled to 3 L total volume. Twice, methanol (2×5.0 L, 2×5.0 L/kg) was added, and the mixture was distilled to 3 L total volume. Potency-adjusted assay yield was 68-75%, typical LC-purity was >95.0 Area %. The resulting solution of compound M (wherein Ar[1] is pyridinyl) in methanol was suitable for use directly in the next step of the process.

A sample of compound M (wherein Ar[1] is pyridinyl) was concentrated in vacuo for characterization by NMR. $^1$H NMR (300 MHz, CDCl$_3$) □□8.30 (dd, J=1.2, 5.1 Hz, $^1$H), 7.36 (ddd, J=1.2, 7.9, 8.2 Hz, 1H), 7.08 (d, J=7.9 Hz, 1H), 6.85 (dd, J=5.1, 8.2 Hz, 1H). LRMS (ESI): Calcd. for C$_{12}$H$_{17}$N$_1$S$_1$+Na: 230.1, found: 230.1.

Synthesis of Compound N (Wherein Ar[1] is pyridinyl)

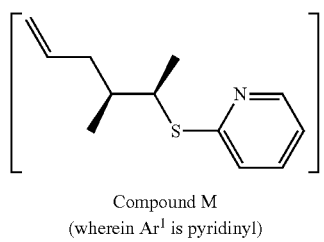

Compound M
(wherein Ar[1] is pyridinyl)

i. H$_2$O$_2$, Na$_2$WO$_4$, AcOH MeOH, 25° C.
ii. H$_2$O, then aq. Na$_2$S$_2$O$_3$, then H$_2$O, then heptane 2-(((2R,3S)-3-methylhex-5-en-2-yl)sulfonyl)pyridine (Compound N, wherein Ar[1] is pyridinyl): To a 10 L glass lined, jacketed reactor was charged compound M (wherein Ar[1] is pyridinyl) (468 g, 2.26 mol, 1.00 equiv.) and the mixture was diluted with methanol (1.4 L, 3.0 L/kg). Acetic acid (136 g, 2.26 mol, 1.00 equiv.) was added and then sodium tungstate dehydrate (75 g, 0.23 mol, 0.10 equiv.) was added. The mixture was stirred at +25° C., and hydrogen peroxide (276 g, 2.94 mol, 1.3 equiv.) was added over 4.5 h, maintaining the temperature NMT+25° C. After the addition was complete, the reaction was stirred for 24 h. Water (2.34 L, 5.0 L/kg) was added over 1 h to induce crystallization. The crystallization mixture was cooled to 0° C. and stirred for 2 h. The product was then filtered at 0° C. and then the wet cake was washed under agitation with aqueous sodium thiosulfate (1.2 mol/L solution; 1.87 L, 4.0 L/kg, 2.26 mol, 1.00 equiv.) at +25° C. The wet cake was washed under agitation with water (1.87 L, 4.0 L/kg) and was then washed with heptane (1.87 L, 4.0 L/kg). The product was dried under vacuum at +30° C. to yield 530 g compound N (wherein Ar[1] is pyridinyl) as a white crystalline solid (98% yield, 98.6 LC-Area % purity, 99.8% w/w assay).

$^1$H NMR (500 MHz, DMSO-d$_6$) □□8.81 (dd, J=1.2, 5.1 Hz, $^1$H), 8.18 (ddd, J=1.2, 7.9, 8.2 Hz, 1H), 8.08 (d, J=7.9 Hz, 1H), 7.77 (dd, J=5.1, 8.2 Hz, 1H), 5.68 (m, 1H), 5.05 (m, 2H), 3.70 (m, 1H), 2.26 (m, 1H), 2.05 (m, 2H), 1.09 (d, J=7.2 Hz, 3H), 0.98 (d, J=7.2 Hz, 3H). LRMS (ESI): Calcd. for C$_{12}$H$_{17}$N$_1$S$_1$+H: 208.3, found: 208.3. IR (neat) □max 3086, 2980, 2966, 2934, 1450, 1428, 1304, 1108, 794, 593, 541.

Synthesis of Compound Z

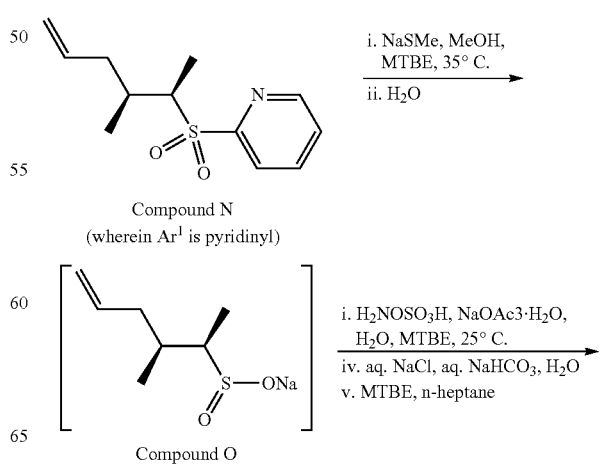

Compound N
(wherein Ar[1] is pyridinyl)

i. NaSMe, MeOH, MTBE, 35° C.
ii. H$_2$O

Compound O i. H$_2$NOSO$_3$H, NaOAc3·H$_2$O, H$_2$O, MTBE, 25° C.
iv. aq. NaCl, aq. NaHCO$_3$, H$_2$O
v. MTBE, n-heptane

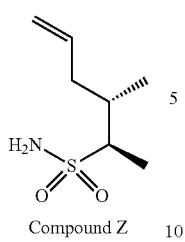

Compound Z (2R,3S)-3-methylhex-5-ene-2-sulfonamide (Compound Z): To a 10 L glass lined, jacketed reactor are charged compound N (wherein $Ar^1$ is pyridinyl) (300 g, 1.25 mol, 1.00 equiv.) and sodium thiomethoxide (105 g, 1.50 mol, 1.20 equiv.). Degassed solvents tert-butyl methyl ether (3.30 L, 11.0 L/kg) and methanol (3.00 L, 1.00 L/kg) are added, and the resulting mixture was stirred at +35° C. for 12 h, until complete formation of compound O as measured by HPLC. The reaction was cooled to +25° C. and water (3.0 L, 10 L/kg) was added. The phases were separated, and the aqueous phase was washed twice with tert-butyl methyl ether (2× 1.5 L, 2× 5.0 L/kg). The organic phase was discarded. Air was bubbled into the product-rich aqueous layer for 4 h at +25° C. to consume residual sodium thiomethoxide. The aqueous layer was diluted with tert-butyl methyl ether (1.5 L, 5.0 L/kg). To the biphasic mixture was added sodium acetate trihydrate (200 g, 1.5 mol, 1.2 equiv.) and hydroxylamine-O-sulfonic acid (170 g, 1.5 mol, 1.2 equiv.). The biphasic mixture was stirred at +25° C. for 2 h until complete conversion of sulfinate to product compound Z, as measured by LC. Aqueous sodium chloride (5.5 mol/L solution, 1.35 L, 4.5 L/kg) was added and the mixture stirred for 30 min. The phases were separated, and the aqueous layer was extracted twice with tert-butyl methyl ether (2× 1.35 L, 2×4.50 L/kg). The combined organic phases were washed sequentially with aqueous sodium bicarbonate (1 mol/L solution; 900 mL, 3.0 L/kg), with aqueous sodium chloride (5.5 mol/L solution, 600 mL, 2.0 L/kg), and water (600 mL, 2.0 L/kg). The organic phase was distilled under reduced vacuum at +40 to +45° C. to 600 mL total volume. Solvent tert-butyl methyl ether (1.35 L, 4.50 L/kg) was added, and the mixture was distilled under reduced vacuum +40 to +45° C. to 600 mL total volume. The solution was cooled to +15° C., and n-heptane (1.5 L, 5.0 L/kg) was added slowly over 2 h to promote crystallization. The slurry was cooled to 0° C. and stirred for 3 h. The product was filtered and the wet cake was washed with n-heptane (600 mL, 2.0 L/kg). The product was dried under vacuum at +30° C. to yield 168 g compound Z as a white crystalline solid (76% yield, 99.8 LC-Area % purity, 99.5% GC-purity, 100.0% w/w assay, 99.8% chiral-GC).

$^1$H NMR (500 MHz, DMSO-$d_6$) □□6.69 (s, 2H), 5.75 (m, 1H), 5.06 (m, 2H), 2.92 (m, 1H), 2.31 (m, 1H), 2.03 (m, 2H), 1.17 (d, J=7.2 Hz, 3H), 0.92 (d, J=7.2 Hz, 3H). LRMS (ESI): Calcd. for $C_7H_{15}N_1O_2S_1$+Na: 200.1, found: 200.1. IR (neat) □max 3323, 3255, 2980, 2962, 1556, 1452, 1312, 1165, 11137, 900, 593, 548, 511.

What is claimed is:

1. A process for synthesizing compound Z, or a salt thereof:

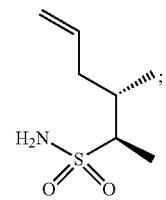

comprising:
(a) admixing (2S,3S)-butane-2,3-diol, a bromide source, and acetic acid to form compound I

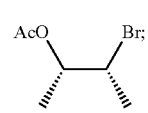

(b) admixing compound I and a non-nucleophilic base to form compound J

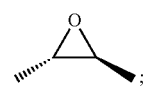

(c) admixing compound J and an allyl nucleophile to form compound K

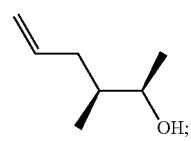

(d) admixing compound K, a leaving group reagent, and an amine base to form compound L

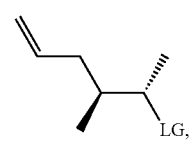

wherein LG is a leaving group;
(e) admixing compound L, a non-nucleophilic base, and $Ar^1$—SH to form compound M

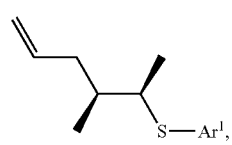

wherein $Ar^1$ is a 5-12 membered heteroaryl comprising from 1 to 3 ring heteroatoms selected from O, N, and S;

(f) oxidizing compound M to form compound N

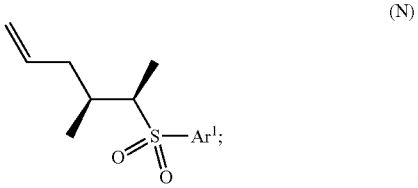

and (g) admixing compound N, a base and hydroxylamine-O-sulfonic acid to form compound Z.

2. The process of claim 1, wherein the bromide source comprises HBr, PBr$_3$, or a combination thereof.

3. The process of claim 2, wherein HBr is present in acetic acid in an amount of 20 w/w % to 50 w/w %.

4. The process of claim 3, wherein HBr is present as a 33% w/w solution in acetic acid.

5. The process of claim 1, wherein the admixing of step (a) occurs at a temperature of −20° C. to 10° C.

6. The process of claim 1, wherein the admixing of step (a) occurs for 1 hour to 24 hours.

7. The process of claim 6, wherein the admixing of step (a) occurs for 15 hours to 20 hours.

8. The process of claim 1, wherein step (b) further comprises monoethylene glycol.

9. The process of claim 8, wherein, for step (b), the non-nucleophilic base and monoethylene glycol are stirred together prior to admixing with compound I.

10. The process of claim 9, wherein the non-nucleophile base and monoethylene glycol are stirred together at a temperature of 25° C. to 40° C.

11. The process of claim 1, wherein the non-nucleophilic base comprises lithium tert-butoxide, sodium tert-butoxide, potassium tert-butoxide, sodium tert-amylate, potassium amylate, or a combination thereof.

12. The process of claim 11, wherein the non-nucleophilic base comprises potassium tert-butoxide.

13. The process of claim 1, wherein the admixing of step (b) occurs in an organic solvent comprising tert-butyl methyl ether, 2-methyltetrahydrofuran, cyclopentyl methyl ether, dimethoxyethane, or a combination thereof.

14. The process of claim 13, wherein the organic solvent comprises tert-butyl methyl ether.

15. The process of claim 1, wherein the admixing of step (b) occurs for 10 minutes to 2 hours.

16. The process of claim 15, wherein the admixing of step (b) occurs for 30 minutes.

17. The process of claim 1, wherein the admixing of step (b) occurs at a temperature of 70° C. to 120° C.

18. The process of claim 1, wherein the allyl nucleophile is

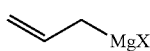

and X is a halide.

19. The process of claim 18, wherein X is Cl.

20. The process of claim 1, wherein the admixing of step (c) occurs in an organic solvent comprising tetrahydrofuran, 2-methyltetrahydrofuran, tert-butyl methyl ether (MTBE), cyclopentyl methyl ether, dimethoxyethane, or a combination thereof.

21. The process of claim 20, wherein the organic solvent comprises tetrahydrofuran and MTBE.

22. The process of claim 1, wherein compound J is added to the allyl nucleophile dropwise over 1 hour to 5 hours.

23. The process of claim 1, wherein the admixing of step (c) occurs for 1 hour to 6 hours.

24. The process of claim 23, wherein the admixing of step (c) occurs for 3 hours.

25. The process of claim 1, wherein the admixing of step (c) occurs at a temperature of −20° C. to 10° C.

26. The process of claim 1, wherein compound J and the allyl nucleophile are present in a molar ratio of 1:1.05 to 1:3.

27. The process of claim 1, wherein leaving group comprises F, Cl, Br, I, mesyl, tosyl, nosyl, or triflyl.

28. The process of claim 27, wherein the leaving group is mesyl.

29. The process of claim 27, wherein the leaving group reagent comprises mesyl chloride, tosyl chloride, nosyl chloride, methanesulfonic anhydride, para-toluenesulfonic anhydride, or a combination thereof.

30. The process of claim 29, wherein the leaving group reagent is mesyl chloride.

31. The process of claim 1, wherein the admixing of step (d) occurs in an organic solvent comprising dichloromethane, tetrahydrofuran, 2-methyltetrahydrofuran, tert-butyl methyl ether, or a combination thereof.

32. The process of claim 31, wherein the organic solvent comprises tetrahydrofuran.

33. The process of claim 31, wherein the organic solvent does not comprise dichloromethane.

34. The process of claim 1, wherein the leaving group reagent is added to a solution comprising compound K and the amine base.

35. The process of claim 34, wherein the leaving group reagent is added to the solution over 2 hours to 3 hours then stirred for 10 minutes to 1 hour.

36. The process of claim 1, wherein the amine base of step (d) comprises trimethylamine, pyridine, triethylamine, aniline, diisopropylethylamine, 1,8-diazabicyclo [5.4.0] undec-7-ene (DBU), 1,4-diazabicyclo [2.2.2] octane (DABCO), 2,6-lutidine, or a combination thereof.

37. The process of claim 36, wherein the amine base comprises triethylamine.

38. The process of claim 1, wherein the admixing of step (d) occurs at a temperature of −10° C. to 10° C.

39. The process of claim 1, wherein the leaving group is present at 1.2 to 2 molar equivalents, based upon compound K.

40. The process of claim 1, wherein the amine base is present at 1.8 to 3.3 molar equivalents, based upon compound K.

41. The process of claim 1, wherein, for step (e), compound L is added to a mixture comprising Ar$^1$—SH and the non-nucleophilic base.

42. The process of claim 41, wherein compound L is added dropwise over 3 to 6 hours.

43. The process of claim 1, wherein the non-nucleophilic base of step (e) comprises lithium hexamethyldisilazide ("HMDS"), sodium HMDS, potassium HMDS, lithium diisopropylamide, sodium diisopropylamide, potassium diisopropylamide, lithium tert-butoxide, sodium tert-butoxide, potassium tert-butoxide, lithium tert-amylate, sodium tert-amylate, potassium tert-amylate, or a combination thereof.

44. The process of claim 43, wherein the non-nucleophilic base comprises sodium tert-butoxide, potassium tert-butoxide, or sodium tert-amylate.

45. The process of claim 1, wherein compound L and the non-nucleophilic base of step (e) are present in a molar ratio of 1:1.1 to 1:4.

46. The process of claim 1, wherein Ar$^1$ is selected from the group consisting of

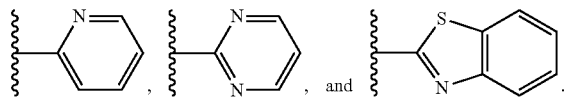

47. The process of claim 46, wherein Ar$^1$ is

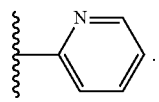

48. The process of claim 1, where compound L and Ar$^1$—SH are present in a molar ratio of 1:1.05 to 1:2.5.

49. The process of claim 1, wherein the admixing of step (e) of compound L, Ar$^1$—SH, and the non-nucleophilic base occurs for 3 hours to 5 hours.

50. The process of claim 1, wherein the admixing of step (e) occurs at a temperature of 60° C. to 80° C.

51. The process of claim 1, wherein compound M is washed three to five times with aqueous sodium hydroxide prior to the oxidizing of step (f).

52. The process of claim 1, wherein the oxidizing of step (f) comprises admixing compound M with a oxidation catalyst and hydrogen peroxide.

53. The process of claim 52, wherein the oxidation catalyst is sodium tungstate dehydrate, 3-chloroperbenzoic acid, or a combination thereof.

54. The process of claim 53, wherein the oxidation catalyst is sodium tungstate dehydrate.

55. The process of claim 52, wherein compound M and the oxidation catalyst are present in a molar ratio of 1:0.05 to 1:0.5.

56. The process of claim 52, wherein the oxidizing further comprises admixing acetic acid.

57. The process of claim 52, wherein compound M and hydrogen peroxide are present in a molar ratio of 1:1.3 to 1:5.

58. The process of claim 1, wherein the oxidizing of step (f) occurs in a solvent.

59. The process of claim 58, wherein the solvent comprises methanol or ethanol.

60. The process of claim 52, wherein compound M, the oxidation catalyst, and acetic acid are admixed prior to addition of hydrogen peroxide.

61. The process of claim 60, wherein hydrogen peroxide is added over 3 hours to 5 hours.

62. The process of claim 1, wherein the oxidizing of step (f) occurs at a temperature of 20° C. to 25° C.

63. The process of claim 1, wherein, for step (g), compound N and the base are admixed together in a solvent to form an intermediate compound O

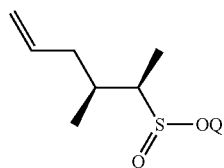

prior to admixing with hydroxylamino-O-sulfonic acid, wherein Q is an alkali metal cation.

64. The process of claim 63, wherein the admixing of compound N and the base occurs in a solvent comprising tert-butyl methyl ether, methanol, tetrahydrofuran, 2-methyltetrahydrofuran, or a combination thereof.

65. The process of claim 64, wherein the solvent comprises tert-butyl methyl ether and methanol.

66. The process of claim 63, wherein the admixing of compound N and the base occurs at a temperature of 25° C. to 50° C.

67. The process of claim 63, wherein the base comprises sodium thiomethoxide, sodium methoxide, methanol and potassium carbonate, or a combination thereof.

68. The process of claim 67, wherein the base is sodium thiomethoxide.

69. The process of claim 63, wherein hydroxylamine-O-sulfonic acid is added with sodium acetate, potassium acetate, sodium formate, potassium formate, or a combination thereof, to the intermediate compound O.

70. The process of claim 69, wherein hydroxylamine-O-sulfonic acid is added with sodium acetate trihydrate to the intermediate compound O.

71. The process of claim 70, wherein the admixing of the intermediate compound O, hydroxylamine-O-sulfonic acid, and sodium acetate occurs in a solvent comprising tert-butyl methyl ether, methanol, tetrahydrofuran, 2-methyltetrahydrofuran, or a combination thereof.

72. The process of claim 63, wherein the admixing of the intermediate compound O, hydroxylamine-O-sulfonic acid, and sodium acetate occurs for 30 minutes to 4 hours.

73. The process of claim 72, wherein the admixing of the intermediate compound O, hydroxylamine-O-sulfonic acid and sodium acetate occurs for 2 hours.

74. The process of claim 1, wherein the admixing of the intermediate compound O, hydroxylamine-O-sulfonic acid and sodium acetate occurs at a temperature of 25° C. to 50° C.

75. The process of claim 1, further comprising crystallizing compound Z.

76. The process of claim 75, wherein the crystallizing comprises heating a solution of compound Z to 40° C. to 45° C., then cooling the solution to 10° C. to 15° C. and adding a crystallizing solvent to the cooled solution to form crystals of compound Z.

77. The process of claim 76, wherein the solution of compound Z comprises tert-butyl methyl ether and the crystallizing solvent comprises heptane.

78. The process of claim 76, wherein the solution of compound Z comprises methanol and the crystallizing solvent comprises water.

79. The process of claim 1, wherein the process further comprises using compound Z to synthesize compound A1 or a salt or solvate thereof

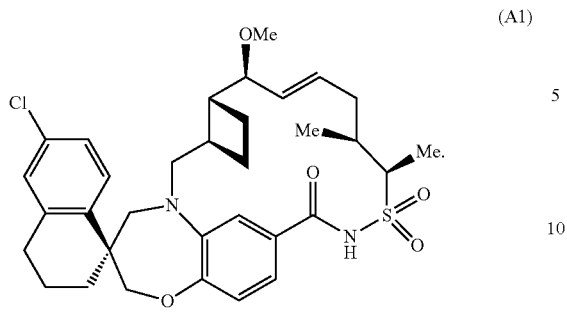
(A1)
80. The process of claim 1, wherein the process further comprises using compound Z to synthesize compound A2 or a salt or solvate thereof
(A2)
* * * * *